(12) United States Patent
Potapenko et al.

(10) Patent No.: US 12,169,009 B2
(45) Date of Patent: Dec. 17, 2024

(54) FRICTION BRAKE BODY FOR A FRICTION BRAKE OF A MOTOR VEHICLE, METHOD FOR PRODUCING A FRICTION BRAKE

(71) Applicant: Robert Bosch GmbH, Stuttgart (DE)

(72) Inventors: Ilja Potapenko, Biedenkopf (DE); Christian Schnatterer, Oberursel (DE); Thomas Kiedrowski, Sersheim (DE); Kangjian Wu, Marburg (DE); Simon Loskyll, Neustadt (DE); Sebastian Hellfeier, Dautphetal (DE)

(73) Assignees: Robert Bosch GmbH, Stuttgart (DE); Buderus Guss Gmb, Breidenbach (DE)

( * ) Notice: Subject to any disclaimer, the term of this patent is extended or adjusted under 35 U.S.C. 154(b) by 292 days.

(21) Appl. No.: 17/611,677

(22) PCT Filed: May 15, 2020

(86) PCT No.: PCT/EP2020/063593
§ 371 (c)(1),
(2) Date: Nov. 16, 2021

(87) PCT Pub. No.: WO2020/234146
PCT Pub. Date: Nov. 26, 2020

(65) Prior Publication Data
US 2022/0213941 A1 Jul. 7, 2022

(30) Foreign Application Priority Data

May 18, 2019 (DE) .................... 10 2019 207 290.9

(51) Int. Cl.
*F16D 65/12* (2006.01)
*B23K 26/00* (2014.01)
(Continued)

(52) U.S. Cl.
CPC ........ *F16D 65/127* (2013.01); *B23K 26/0006* (2013.01); *B23K 26/354* (2015.10);
(Continued)

(58) Field of Classification Search
CPC ........... F16D 65/12; F16D 65/123–128; F16D 69/02; F16D 55/22; F16D 2065/132;
(Continued)

(56) References Cited

U.S. PATENT DOCUMENTS 10,260,585 B2 4/2019 Saga et al.
2002/0179204 A1 12/2002 Brunson
(Continued)

FOREIGN PATENT DOCUMENTS

CN 102308112 A 1/2012
CN 105556155 A 5/2016
(Continued)

OTHER PUBLICATIONS

International Search Report corresponding to PCT Application No. PCT/EP2020/063593, mailed Jul. 21, 2020 (German and English language document) (7 pages).

*Primary Examiner* — Christopher P Schwartz
(74) *Attorney, Agent, or Firm* — Maginot, Moore & Beck

(57) ABSTRACT

The disclosure relates to a friction brake body for a friction brake of a motor vehicle, in particular a brake disc, wherein the friction brake body comprises a base body made from gray cast iron, and at least one wear resistant layer formed at least in areas on the base body. The wear resistant layer is a laser alloyed or laser dispersed edge layer of the base body and comprises at least one additive.

8 Claims, 2 Drawing Sheets

(51) Int. Cl.
  *B23K 26/354*   (2014.01)
  *C21D 1/18*     (2006.01)
  *C21D 5/00*     (2006.01)
  *C21D 9/00*     (2006.01)
  *F16D 69/02*    (2006.01)
  *B23K 101/00*   (2006.01)
  *B23K 101/34*   (2006.01)
  *B23K 103/06*   (2006.01)
  *F16D 55/22*    (2006.01)
  *F16D 65/02*    (2006.01)

(52) U.S. Cl.
  CPC ............... *C21D 1/18* (2013.01); *C21D 5/00* (2013.01); *C21D 9/0068* (2013.01); *F16D 65/125* (2013.01); *F16D 69/02* (2013.01); *B23K 2101/006* (2018.08); *B23K 2101/35* (2018.08); *B23K 2103/06* (2018.08); *F16D 55/22* (2013.01); *F16D 2065/132* (2013.01); *F16D 2065/1344* (2013.01); *F16D 2200/0013* (2013.01); *F16D 2200/0047* (2013.01); *F16D 2200/0078* (2013.01); *F16D 2250/0046* (2013.01)

(58) Field of Classification Search
  CPC ..... F16D 2065/1344; F16D 2200/0013; F16D 2200/0047; F16D 2200/0078; F16D 2250/0046; B23K 26/0006; B23K 26/354; B23K 2101/006; B23K 2103/06; C21D 1/18; C21D 5/00; C21D 9/0068

USPC .................................................. 188/218 XL
  See application file for complete search history.

(56)         References Cited

U.S. PATENT DOCUMENTS

| | | |
|---|---|---|
| 2006/0207080 A1 | 9/2006 | Keate |
| 2008/0131621 A1* | 6/2008 | Lineton ............... C23C 24/10 427/556 |
| 2011/0278116 A1* | 11/2011 | Lembach ............ F16D 69/027 188/218 XL |
| 2014/0262642 A1* | 9/2014 | Schluck ............... F16D 65/127 188/218 XL |
| 2016/0223041 A1* | 8/2016 | Saga ................... B23K 26/1476 |
| 2017/0122392 A1 | 5/2017 | Lembach |
| 2017/0253945 A1* | 9/2017 | Teraoka ................ C22C 38/02 |
| 2020/0072307 A1* | 3/2020 | Rettig ................... C23C 28/021 |
| 2021/0293292 A1* | 9/2021 | Rettig ................... B23K 26/342 |

FOREIGN PATENT DOCUMENTS

| | | | |
|---|---|---|---|
| CN | 104533992 B * | 6/2018 | ............... C23C 8/64 |
| DE | 10345000 B3 * | 1/2005 | ............. C23C 24/10 |
| DE | 10 2009 008 105 A1 | 8/2010 | |
| DE | 10 2009 008 114 A1 | 8/2010 | |
| DE | 10 2015 013 706 A1 | 4/2017 | |
| DE | 10 2017 212 706 A1 | 1/2019 | |
| EP | 1 336 054 B1 | 9/2008 | |
| EP | 2 746 613 A2 | 6/2014 | |
| EP | 3 034 902 A1 | 6/2016 | |

* cited by examiner

FRICTION BRAKE BODY FOR A FRICTION BRAKE OF A MOTOR VEHICLE, METHOD FOR PRODUCING A FRICTION BRAKE

This application is a 35 U.S.C. § 371 National Stage Application of PCT/EP2020/063593, filed on May 15, 2020, which claims the benefit of priority to Serial No. DE 10 2019 207 290.9, filed on May 18, 2019 in Germany, the disclosures of which are incorporated herein by reference in their entirety.

The disclosure relates to a friction brake element for a friction brake of a motor vehicle, in particular a brake disc, where the friction brake element has a main element made of gray cast iron and at least one antiwear layer present at least in regions on the main element.

The disclosure further relates to a friction brake for a motor vehicle, in particular a wheel brake, which has at least one brake disc which can be joined or is joined in a fixed manner to a wheel of the motor vehicle and at least one movable brake pad.

In addition, the disclosure relates to a process for producing the abovementioned friction brake element.

BACKGROUND

Friction brakes for motor vehicles usually have, as friction brake elements, a brake disc and at least one brake pad which achieve a braking effect by being pressed together. Here, the brake disc is usually fixed to a wheel of the motor vehicle and the brake pad is fixed to the vehicle body and can be moved in such a way that it can be brought into contact with the brake disc in order to achieve friction between brake disc and brake pad by pressing together, by means of which the speed of rotation of the brake disc or of the wheel coupled to the brake disc is reduced. Owing to the frictional contact between brake pad and brake disc, abrasion occurs on the brake disc and this leads to brake dust and also to wear of the brake disc. In order to reduce this wear, it is known that the friction brake element can be provided with an antiwear layer at least in the contact region with the brake pad. For example, application of an antiwear layer based on cemented hard materials or carbides to a main element of the friction brake element made of gray cast iron is known.

SUMMARY

The friction brake element of the disclosure having the features of the disclosure has the advantage that the abrasion on the friction brake element is reduced and the wear and corrosion resistance of the frictional contact surface of the friction brake element is increased by simple and inexpensive means. According to the disclosure, the antiwear layer is a laser-alloyed or laser-dispersed surface layer of the main element, which is made of gray cast iron, with at least one additive. The antiwear layer is thus an surface layer of the gray cast iron main element which has been melted by laser irradiation and provided with an additive. The microstructure of the surface layer is advantageously influenced by the melting and addition of the at least one additive and, depending on the choice of additive and as a function of the amount of additive selected, a greater abrasion resistance and possibly also an increased corrosion resistance of the surface layer or the antiwear layer of the main element is achieved.

In a preferred further development of the disclosure, the at least one additive comprises carbides, in particular from the group consisting of chromium carbide, niobium carbide, titanium carbide, tungsten carbide, molybdenum carbide and vanadium carbide. These additives have the advantage that they at least partially melt in the melt bath and form a substance-to-substance bond with the gray cast iron matrix and thus form a compact antiwear layer on the surface or in the surface layer of the gray cast iron main element. If the supplementary material added does not melt or melts only insignificantly and the chemical composition of the gray cast iron matrix therefore does not change significantly, this is referred to as laser dispersion. If the additive is at least partially melted or at least substantially melted so that a measurable change in the chemical composition of the gray cast iron matrix occurs, this is referred to as laser alloying.

Furthermore, preference is given to chromium, in particular elemental chromium or ferrochromium, and at least one further carbide-forming element, in particular from the group consisting of titanium, niobium, vanadium, tungsten and molybdenum, being present as additive. After introduction of the additives into the melt, at least substantial melting of the additives and substantial homogeneous distribution in the melt bath occur. During solidification of the at least one carbide-forming element alloyed in in addition to chromium forms metal carbides with the carbon present in the melt, thus reducing the content of free carbon in the surface layer and increasing the abrasion resistance of the main element in the surface layer. Particular preference is given to adding more elemental chromium than the amount of free carbon present for formation of chromium carbide in the surface layer, so that the chromium remains substantially undissolved after solidification in the iron matrix of the laser-alloyed surface layer and thus forms a passive layer on the surface in the presence of oxygen, offering effective corrosion protection.

It is particularly preferable when solidification and cooling occurs in the surface layer in the laser alloying or laser dispersion sufficiently quickly that a martensitic basic microstructure is formed in the surface layer immediately after laser alloying or laser dispersion, thus increasing abrasion resistance.

The friction brake of the disclosure having the features disclosed herein is characterized by the configuration according to the disclosure of the friction brake element, in particular of the brake disc. The abovementioned advantages are obtained.

The process of the disclosure for producing the friction brake element for a friction brake having the features disclosed herein is characterized by the antiwear layer being produced by laser alloying or laser dispersion of a surface layer of the gray cast iron main element with at least one additive. The abovementioned advantages are obtained. In particular, the surface layer of the main element is melted by means of laser radiation to form a melt and the melt is provided with the additive. The additive is thus introduced into the molten material of the main element and becomes distributed there as a result of convective melt bath mixing, so that a homogeneous distribution of the additive in the surface layer is obtained.

The additive is particularly preferably introduced in powder form into the melt, so that advantageous distribution of the additive in the melt is ensured and the additive advantageously reacts metallurgically with the melt. The pulverulent additive can be applied as powder bed to the main element before laser irradiation, or can be added simultaneously or with a time offset from the laser radiation treatment to the melt produced.

In a preferred embodiment of the disclosure, carbides, in particular from the group consisting of chromium carbide, niobium carbide, titanium carbide, tungsten carbide, molybdenum carbide and vanadium carbide, are used as additive.

In a further embodiment of the disclosure, elemental metals, in particular chromium and at least one element from the group consisting of titanium, niobium, vanadium, tungsten and molybdenum, are used as additive. The abovementioned advantages are obtained.

In a preferred further development of the disclosure, more chromium is added to the melt than the amount of free carbon available for formation of chromium carbide in the melt; in particular, the content of free chromium atoms in the laser-alloyed surface layer should be at least 10% by weight in order to achieve sufficient corrosion resistance of the friction brake element, as mentioned above.

In a preferred further development of the disclosure, the melt is, in particular, cooled rapidly for formation of a martensite layer, so that a martensitic basic microstructure is formed immediately after laser alloying or laser dispersion.

Particularly if the cooling rate has not been sufficient, at least one further hardening process, in particular laser hardening, induction hardening or flame hardening, is carried out after cooling of at least the surface layer in order to obtain the martensitic basic microstructure.

Preference is given to at least the surface layer being heat treated at least once, preferably a number of times, after cooling in order to ensure permanent heat resistance and temperature resistance of the martensite. In particular, the heat treatment assists carbide precipitation when using carbide-forming elements from the group consisting of tungsten, molybdenum and vanadium in order to form metal carbides. Here, the heat resistance and temperature resistance of the martensite up to temperatures of 600° C. is achieved by precipitation of fine metal carbides, which reduces the diffusivity of carbon in the iron lattice of the main element. To achieve carbide precipitation, the heat treatment is preferably carried out at temperatures of 550° C.

BRIEF DESCRIPTION OF THE DRAWINGS

Further advantages and preferred features and combinations of features may be derived, in particular, from the above description and from the disclosure. The disclosure will be illustrated below with the aid of the drawing. The figures show FIG. 1 a brake disc in a simplified depiction, FIG. 2 a simplified sectional view of an advantageous production process and FIG. 3 a flow diagram to explain the production process.

DETAILED DESCRIPTION

Figure 1:
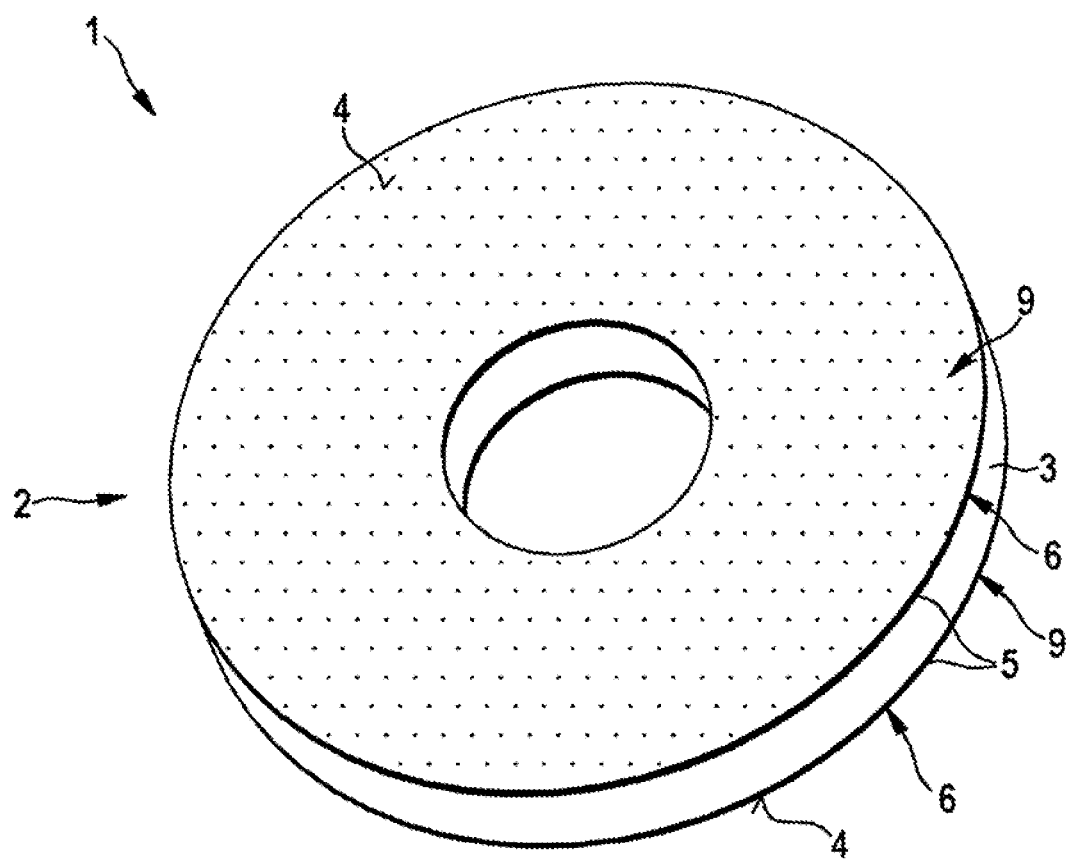

FIG. 1 shows, in a simplified perspective view, a friction brake element 1 which is configured as brake disc 2 for a friction brake, which is not shown in more detail here, of a motor vehicle. The brake disc 2 has a main element 3 made of gray cast iron, which is configured as an annulus. A brake disc chamber which is optionally present on the brake disc 2 is not shown in FIG. 1.

On each of its two faces, the main element 3 has an annular frictional contact surface 4 which is provided with an antiwear layer 5. In the intended use, the antiwear layer 5 forms the contact partner of one or more brake pads of the friction brake which can be pressed against the brake disc to achieve friction braking. The friction between brake pad and brake disc 2 or friction brake element 1 arising during friction braking results in abrasion on the friction brake element 1 which leads to wear of the friction brake element 1 and also to brake dust which can get into the surroundings of the motor vehicle. This wear and the brake dust are reduced by the antiwear layer 5. In addition, high corrosion resistance of the antiwear layer is provided.

The antiwear layer 5 is for this purpose a laser-alloyed and/or laser-dispersed surface layer 6 of the main element 3, which comprises at least one additive 9.

Figure 2:
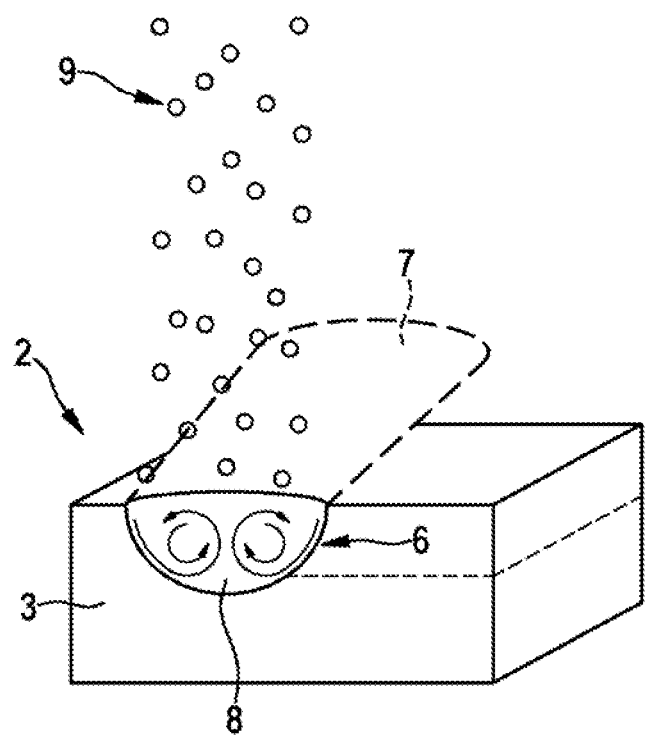

FIG. 2 shows a production process for the brake disc in a simplified sectional view. The main element 3 and its surface layer 6 in which the antiwear layer 5 is produced by laser alloying are shown. To effect laser alloying, a laser beam 7 is passed over the main element 3, with the laser beam being sufficiently energy-rich for the surface layer 6 of the main element 3 to melt so as to give a melt 8. At least one pulverulent additive 9 is introduced in this melt 8. Compared to laser buildup welding in which the additive 9 can be at least partially liquefied before reaching the melt, both the amount and the rate of introduction of the additive 9 is significantly lower in the case of laser alloying, so that the additive 9 introduced is, in particular, at least largely melted in the melt 8 and together with the molten material of the main element 3 leads to a zone having altered chemical compositions in the region close to the surface or the surface layer 6 of the main element 3.

The hardness and corrosion resistance of the surface layer 6 is increased by the alloying-in of the abovementioned metallic or ceramic powders. Compared to conventional antiwear layers which are applied by means of laser buildup welding or thermal spraying processes, the present friction brake element 1 has a significant cost advantage brought about by a significantly decreased amount of additive. Due to the increased wear and corrosion resistance and the resulting reduced brake duct emission, advantages in respect of environmental protection are also obtained.

Figure 3:
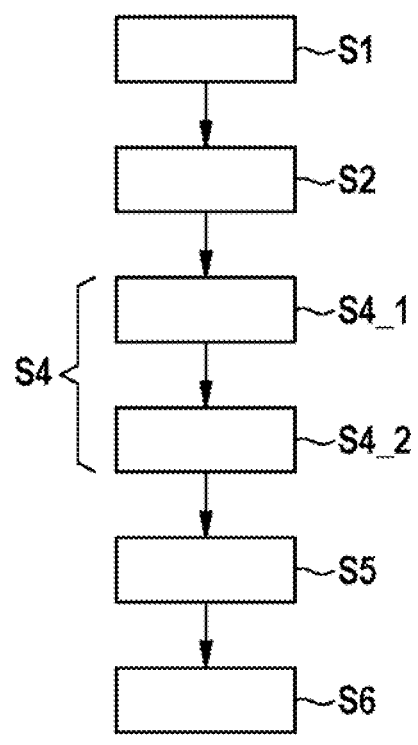

FIG. 3 shows the production process of the friction brake element 1 in a simplified flow diagram.

In a first step S1, a main element 3 made of gray cast iron is provided. Here, the main element 3 is manufactured in a conventional way so that it has an annular configuration and has an annular frictional contact surface 4 for a brake pad of the friction brake on each face.

In the subsequent step S2, the frictional contact surface is provided with the antiwear layer 5 by the surface layer 6 of the main element 3 being melted in a first step S4_1 and the at least one additive 9 being introduced in powder form into the resulting melt in a subsequent step S4_2. In step S4_1, the surface layer 6 is, in particular, partially melted by scanning with the laser radiation.

The melt is subsequently cooled in a step S5 and the antiwear layer 5 is obtained.

The additive(s) which is/are introduced into the, in particular superheated, melt 8 melt at least partially. As a result of convection, substantial homogenization of the melt bath composition occurs, as indicated by arrows in FIG. 2.

The friction brake element 1, in particular the antiwear layer 5, is optionally mechanically worked, in particular ground, in a concluding step S6 in order to obtain, for example, a desired surface roughness or geometry.

In a first working example, carbides, in particular from the group consisting of chromium carbide, niobium carbide, titanium carbide, tungsten carbide, molybdenum carbide and vanadium carbide, are added as additives 9 to the melt 8. These melt at least partially in the melt 8 and form a substance-to-substance bond to the gray cast iron matrix, thus forming the antiwear layer 5. If the additive 9 or supplementary material added does not melt or melts only insignificantly, the process is laser dispersion rather than laser alloying.

In a second working example, elemental chromium or more inexpensive ferrochromium and at least one further carbide-forming element, in particular from the group consisting of titanium, niobium, vanadium, tungsten and molybdenum, are added as additive 9 to the melt 8. During solidification, the added carbide-forming elements form metal carbides with the carbon present in the molten material of the main element 3 made of gray cast iron, as a result of which the content of free carbon in the laser-alloyed surface layer is reduced. Particular preference is given to adding more elemental chromium than the amount of free carbon present for formation of chromium carbide in the surface layer, so that the chromium remains substitutionally dissolved in the iron matrix of the laser-alloyed surface layer after solidification and in the presence of oxygen forms a passive layer on the surface, offering corrosion protection.

In step S5, cooling is preferably carried out so quickly that a martensitic basic microstructure is formed in the surface layer 6 immediately after laser alloying or laser dispersion. If the cooling rate is not sufficient, an additional hardening process, for example laser hardening, induction hardening or flame hardening, is preferably carried out after laser alloying and/or cooling.

The high hardness of the surface layer 6 is then based on the formation of martensite. The high heat resistance and thermal stability of the martensite up to temperatures of 600° C. is achieved by precipitation of fine metal carbides which reduce the carbon diffusivity in the iron lattice of the main element 3. To effect carbide precipitation, multiple heat treatment at temperatures of 550° C. is preferably carried out.

The invention claimed is:

1. A process for producing a friction brake element for a friction brake of a motor vehicle, comprising:
   making a main element of the friction brake element from gray cast iron; and
   providing the main element, at least in regions, with at least one antiwear layer, wherein the at least one antiwear layer is produced by one of laser alloying and laser dispersion of at least one additive with or in a surface layer of the main element,
   wherein
   chromium or ferrochromium and at least one further carbide-forming element selected from a group consisting of titanium, niobium, vanadium, tungsten, and molybdenum, are used as the at least one additive;
   the surface layer of the main element is melted to form a melt and the melt is subsequently provided with the at least one additive during the laser alloying or laser dispersion; and
   more chromium is added to the melt than an amount of free carbon available for formation of chromium carbide in the melt in order to ensure a corrosion resistance of the at least one antiwear layer.

2. The process as claimed in claim 1, wherein the at least one additive is introduced in powder form into the melt.

3. The process as claimed in claim 1, wherein carbides selected from a group consisting of chromium carbide, niobium carbide, titanium carbide, tungsten carbide, molybdenum carbide, and vanadium carbide, are used as additive.

4. The process as claimed in claim 1, wherein a martensitic basic microstructure is produced in the at least one antiwear layer after the laser alloying or laser dispersion.

5. The process as claimed in claim 1, further comprising:
   cooling the surface layer after the laser alloying or laser dispersion; and
   carrying out at least one of a laser hardening, an induction hardening, and a flame hardening after cooling.

6. The process as claimed in claim 1, further comprising;
   cooling the surface layer after the laser alloying or laser dispersion; and
   heat treating at least the surface layer at least once after cooling.

7. A process for producing a friction brake element for a friction brake of a motor vehicle, comprising:
   making a main element of the friction brake element from gray cast iron;
   providing the main element, at least in regions, with at least one antiwear layer, wherein the at least one antiwear layer is produced by one of laser alloying and laser dispersion of at least one additive with or in a surface layer of the main element;
   cooling the surface layer after the laser alloying or laser dispersion; and
   carrying out at least one of a laser hardening, an induction hardening, and a flame hardening after cooling.

8. A process for producing a friction brake element for a friction brake of a motor vehicle, comprising:
   making a main element of the friction brake element from gray cast iron;
   providing the main element, at least in regions, with at least one antiwear layer, wherein the at least one antiwear layer is produced by one of laser alloying and laser dispersion of at least one additive with or in a surface layer of the main element;
   cooling the surface layer after the laser alloying or laser dispersion; and
   heat treating at least the surface layer at least once after cooling.

* * * * *